(12) United States Patent
Polderman

(10) Patent No.: US 7,594,942 B2
(45) Date of Patent: Sep. 29, 2009

(54) GAS/LIQUID SEPARATOR

(75) Inventor: Hugo Gerardus Polderman, Amsterdam (NL)

(73) Assignee: Shell Oil Company, Houston, TX (US)

( * ) Notice: Subject to any disclaimer, the term of this patent is extended or adjusted under 35 U.S.C. 154(b) by 633 days.

(21) Appl. No.: 10/936,198

(22) Filed: Sep. 8, 2004

(65) Prior Publication Data
US 2005/0060970 A1  Mar. 24, 2005

(30) Foreign Application Priority Data
Sep. 9, 2003  (EP) .................................. 03077839

(51) Int. Cl.
*B01D 50/00* (2006.01)
(52) U.S. Cl. .............................. 55/321; 55/320; 55/325; 55/337; 55/455; 55/462
(58) Field of Classification Search ................... 55/320, 55/321, 325, 329, 332, 337, 423, 455–457; 95/267–269
See application file for complete search history.

(56) References Cited

U.S. PATENT DOCUMENTS

| | | | |
|---|---|---|---|
| 1,702,612 A | 2/1929 | Morse | |
| 3,410,540 A * | 11/1968 | Bruckert | 261/113 |
| 3,469,373 A | 9/1969 | Lavery | 55/176 |
| 3,550,916 A * | 12/1970 | Hoppe et al. | 261/114.3 |
| 3,807,711 A * | 4/1974 | Hirao et al. | 261/44.1 |
| 3,877,904 A * | 4/1975 | Lowrie | 96/189 |
| 3,997,303 A * | 12/1976 | Newton | 95/284 |
| 4,015,960 A * | 4/1977 | Nutter | 55/355 |
| 4,042,512 A | 8/1977 | McCarthy et al. | 210/519 |
| 4,059,517 A | 11/1977 | Strahorn | 210/73 |

(Continued)

FOREIGN PATENT DOCUMENTS

EP          195464          9/1986

(Continued)

OTHER PUBLICATIONS

Perry's Chemical's Engineers Handbook, $6^{th}$ edition, McGraw-Hill, 1984, p. 18-6.

*Primary Examiner*—Duane Smith
*Assistant Examiner*—Sonji Turner
(74) *Attorney, Agent, or Firm*—William E. Hickman

(57) ABSTRACT

A gas/liquid separator comprising a vertical vessel having an inlet for a gas/liquid mixture; a gas/liquid separation device arranged within the vessel, which separation device has an inlet in fluid communication with the inlet of the vessel, and an outlet means for at least partially separated gas and liquid; an outlet for gas from the vessel, above and in fluid communication with the outlet means of the separation device; a liquid collection space in the vessel, below and in fluid communication with the outlet means of the separation device; and an outlet for liquid from the vessel, having a receiving end in the liquid collection space, wherein the gas/liquid separation device is a vane inlet device and wherein between the separation device and the liquid collection space a liquid collection promoter tray is arranged, forming a receiving area for liquid impinging on the tray from above and having a passage for liquid received on the receiving area to flow to the liquid collection space; and the use of such a gas/liquid separator.

8 Claims, 1 Drawing Sheet

U.S. PATENT DOCUMENTS

| | | | |
|---|---|---|---|
| 4,208,196 A | 6/1980 | Cogins | 55/174 |
| 4,322,233 A * | 3/1982 | Sisk | 55/426 |
| 4,359,329 A | 11/1982 | Welleitner | 55/186 |
| 4,539,023 A | 9/1985 | Boley | 55/174 |
| 4,722,800 A | 2/1988 | Aymong | 210/802 |
| 4,767,424 A | 8/1988 | McEwan | 55/184 |
| 5,068,035 A | 11/1991 | Mohr | 210/236 |
| 5,415,776 A | 5/1995 | Homan | 210/519 |
| 5,520,825 A | 5/1996 | Rice | 210/802 |
| 6,214,220 B1 | 4/2001 | Favret, Jr. | 210/188 |

FOREIGN PATENT DOCUMENTS

| | | |
|---|---|---|
| FR | 2780659 | 1/2000 |
| GB | 1119699 | 7/1968 |
| GB | 2036606 | 7/1980 |
| GB | 2036606 A * | 7/1980 |
| WO | 98/23351 | 6/1998 |
| WO | WO0160478 A1 * | 8/2001 |
| WO | 03/033106 | 4/2003 |
| WO | 03/070348 | 8/2003 |

* cited by examiner

GAS/LIQUID SEPARATOR

FIELD OF THE INVENTION

The invention relates to a vertical separator vessel for separating a gas/liquid mixture. In particular the invention relates to such a vessel comprising an inlet for a gas/liquid mixture; a gas/liquid separation device arranged within the vessel, which separation device has an inlet in fluid communication with the inlet of the vessel, and an outlet means for at least partially separated gas and liquid; and which vessel further comprises an outlet for gas above and in fluid communication with the outlet means of the separation device; a liquid collection space below and in fluid communication with the outlet means of the separation device; and an outlet for liquid arranged to withdraw liquid from the liquid collection space.

BACKGROUND OF THE INVENTION

There are numerous examples in the petroleum and chemical industry where a gas/liquid mixture has to be separated. In many applications the mixture is a gas with a relatively small percentage of liquid that has to be removed from the gas. The liquid may be entrained in smaller or larger quantities by the flowing gas, normally less than 10 vol %, and typically 1-5 vol %. The liquid can be present in the form of small or large droplets, suspended in the form of a mist, as a froth, etc. Well-known examples are water and liquid hydrocarbons in natural gas, liquid absorption agents in a gas treated with such agents and lubricating oil or crude oil in hydrogen or hydrocarbon gas.

Generally, vertical vessels are used when a relatively small percentage of liquid is to be removed from a gas. An argument for the use of a vertical vessel for removing liquid from gas is that it occupies little area, which is particularly advantageous for offshore application on production platforms, but also in refineries.

It is further generally desired to minimize the size of the vertical vessel, for reasons of space requirement, but also in order to minimize capital cost of the separation vessel. However, reducing the vessel diameter means that the fluid velocities, in particular gas velocities, for a given throughput are increased. The internals of the vessel need to be able to provide sufficient separation efficiency for the required capacity at such high gas velocities.

It is customary to compare the capacity of gas/liquid separators (and fractionation columns) in terms of the so-called gas-load factor. The gas-load factor $\lambda$ is defined as $\lambda = Q_g/A_g * (\rho_g/(\rho_l - \rho_g))^{1/2}$. $Q_g$ is the volumetric gas flow rate (m³/s), $A_g$ is the vessel cross-sectional area (m²), $\rho_g$ and $\rho_l$ are the gas and liquid densities, respectively (kg/m³) (Souders and Brown, Ind. Engineering Chemistry, vol. 34 (1934) 98; Perry's Chemical's Engineers Handbook, 6$^{th}$ edition, McGraw-Hill, 1984, p. 18-6). The operating window of vertical gas/liquid separation vessels ranges from $\lambda \leq 0.07$ m/s for open separators without secondary separation internals or so-called demisters, to $\lambda \geq 0.2$ m/s, up to 0.25 m/s and even above for separators with secondary separation internals such as cyclones or vanepacks. The present invention is particularly advantageous in the case that the gas load factor $\lambda$ is about 0.15 m/s or larger, in particular 0.2 m/s or larger. When a separator is used at a gas load factor above its design limit, the separation efficiency is lowered. Typically, for separators for use at gas load factors of 0.15 or larger, the separation efficiency needs to be 0.98 or higher, often 0.99 or higher, wherein the separation efficiency is defined as the fraction of the total liquid in the feed mixture that is removed and not present anymore in the outlet gas.

It is noted that the gas load factor in other separation devices can be much lower. For example, a horizontal three-phase (gas/liquid/liquid) separator is generally operated at gas load factors not exceeding ca 0.07 m/s, and in distillation columns gas load factors do not generally exceed about 0.12 m/s.

The gas/liquid mixture is generally admitted into a separator vessel using a so-called inlet device. Several types of inlet devices are known in the art. UK patent application with publication No. GB 036 606 and International Patent application with publication No. WO 03/033106 both describe a vertical separator with a tangential inlet device. These tangential inlet devices serve to introduce the mixture tangentially along the inner wall of the separation vessel, so as to set the mixture into a swirling motion in a separation zone of the vessel. Liquid separates in the separation zone due to centrifugal forces and runs down the inner vessel wall to accumulate in a liquid sump at the bottom. Above the liquid sump a baffle plate is mounted so that an annular opening with the inner vessel wall remains. The baffle plate demarcates the lower end of the separation zone, and separates the liquid sump from the swirling gas while allowing liquid to run down the inner vessel wall.

French Patent application with publication No. 2 780 659 discloses a vertical vessel into which the gas/liquid mixture is introduced from above. The mixture is distributed into a number of vertically downward streams symmetrically around the axis of the vertical vessel, by an upper baffle plate provided with openings. Each stream is passed down a helical wire separator that is vertically mounted in a separation compartment of the vessel, below the upper baffle plate. The wire separators have their outlets at their lower ends. The separation compartment is delimited from a lower liquid collection compartment by a lower deflector plate, onto which separated gas and liquid from each helical wire separator impinges directly in vertically downward direction. The plate is provided with a central opening through which liquid is discharged to a lower collection compartment. Gas is deflected upwardly and leaves the separation compartment sideways through the vessel wall.

The present invention relates to separation vessels provided with a vane inlet device, which serves to at least partially separate the gas/liquid mixture already at its admission into the vessel. A vane-type inlet device that is also referred to as a Schoepentoeter inlet device is for example described in British patent GB 1 119 699, and another vane inlet device is described in International Patent application publication No. WO 03/070348. A vane inlet device comprises a plurality of outwardly curved vanes arranged one behind the other in the direction of the inflowing gas/liquid mixture. Each vane curvedly extends with respect to the direction of inflowing mixture between an intercepting part having a leading edge substantially in or at a small angle with the direction of flow, and a deflecting part having an outwardly extending trailing edge.

The at least partially separated gas and liquid is admitted into the vessel through the outlet means of the separation device. In a vane-type inlet device, liquid is accumulated on the concave side of the vanes due to centrifugal forces. The outlet means is formed by the plurality of openings formed by consecutive vanes, wherein liquid leaves the vane tips from a layer at the concave side of the vanes, and gas leaves from the remainder of the openings. The liquid subsequently sinks towards the bottom of the vessel and the gas rises to the top.

Often, the gas/liquid separation device serves only for a primary separation at the vessel inlet, wherein in particular a further removal of entrained liquid from the gas is needed. To this end, one or more further separation devices can be arranged above the primary separation device, such as for example described in U.S. Pat. No. 4,767,424.

After the (pre-)separated gas and liquid have been admitted into the vessel via the outlet means of the vane inlet device, there is a risk of re-entrainment of liquid by the gas. It has been observed that this problem increases with increasing gas load factors, as they are encountered when trying to minimize vessel size for a given feed rate of gas/liquid mixture, or maximizing feed rate for a given vessel size. Gas and liquid come into contact again, particularly in the space directly below the (primary) separation device. It has been found that for gas-load factors .lambda. above 0.15 m/s, and in particular above 0.2 m/s re-entrainment of liquid due to high gas velocities in this space is a serious problem, because of loss of separation efficiency and consequently increased duty for secondary separators higher in the vessel.

Moreover it has been observed, that re-entrainment in this space can hinder or even prevent the accumulation of liquid in the liquid collection space, which is normally the space at the bottom of the vessel. Liquid outlet pipes from secondary separators can be arranged to debouche into the liquid collection space, wherein the outlet end of such a pipe is submerged in liquid during normal operation so that they are liquid sealed. Separated liquid is normally withdrawn from the vessel in this liquid collection space.

It is an object of the present invention to provide a vertical separation vessel with vane-inlet device, wherein the accumulation of liquid in the liquid collection space is improved.

SUMMARY OF THE INVENTION

The invention provides a gas/liquid separator comprising:
a vertical vessel having an inlet for a gas/liquid mixture;
a gas/liquid separation device arranged within the vessel, which separation device has an inlet in fluid communication with the inlet of the vessel, and an outlet means for at least partially separated gas and liquid;
an outlet for gas from the vessel, above and in fluid communication with the outlet means of the separation device;
a liquid collection space in the vessel, below and in fluid communication with the outlet means of the separation device; and
an outlet for liquid from the vessel, having a receiving end in the liquid collection space, wherein the gas/liquid separation device is a vane-inlet device, and wherein between the separation device and the liquid collection space a liquid collection promoter tray is arranged, forming a receiving area for liquid impinging on the tray from above and having a passage for liquid received on the receiving area to flow to the liquid collection space.

Applicant has found that by arranging a liquid collection promoter tray the re-entrainment of liquid in gas close to the outlet of the primary separator is reduced, and that the accumulation of liquid in the liquid collection space is improved. Without wishing to be bound by the following explanation, Applicant believes that the beneficial effect of the liquid collection promoter tray is caused by one or both of the following mechanisms. First, the receiving area of the tray provides a surface for the liquid droplets from the space underneath the vane inlet device to settle and to coalesce, which liquid is then passed towards the liquid collection space. Second, the liquid collection promoter tray at least partially shields the liquid collection space from the high gas velocities at the outlet of the (primary) separation device, thereby creating a space immediately above the liquid collection space where fluid velocities are lower to help the liquid to settle and to prevent re-entrainment.

The liquid collection promoter tray is advantageously arranged such that it optically closes the cross-section of the vessel when being looked at from the gas/liquid separator in downward direction. In this way the maximum liquid receiving area is provided for liquid to impinge and coalesce upon, and the space below the liquid collection promoter tray is shielded from the highest gas velocities.

In a particularly advantageous embodiment the liquid collection promoter tray is formed by an assembly of tilted plates. When these plates are arranged in an overlapping manner, an optically closed tray can be obtained which leaves relatively large passages between the plates through which liquid can flow downwardly and through which gas can pass. However, the tray represents a flow restriction for gas flowing vertically downward in the vessel. Gas passing through the tray must have a horizontal velocity component. In effect, the exchange of gas between the spaces immediately above and below the tray will be reduced, and the gas velocities in the space below will be considerably smaller than when no liquid collection promoter tray is arranged.

The invention further provides the use of a gas/liquid separator according to the invention for separating a gas/liquid mixture, in particular at a gas load factor of 0.15 m/s or larger, more in particular 0.20 m/s or larger. The use is beneficial as re-entrainment of liquid is prevented, in particular at relatively high gas load factors. The use of the separator is equivalent to a method for separating a gas/liquid mixture, wherein a separator according to the invention is used.

BRIEF DESCRIPTION OF THE DRAWINGS

The invention will now be described in more detail and with reference to the drawings, wherein.

DETAILED DESCRIPTION OF THE INVENTION

Figure 1:
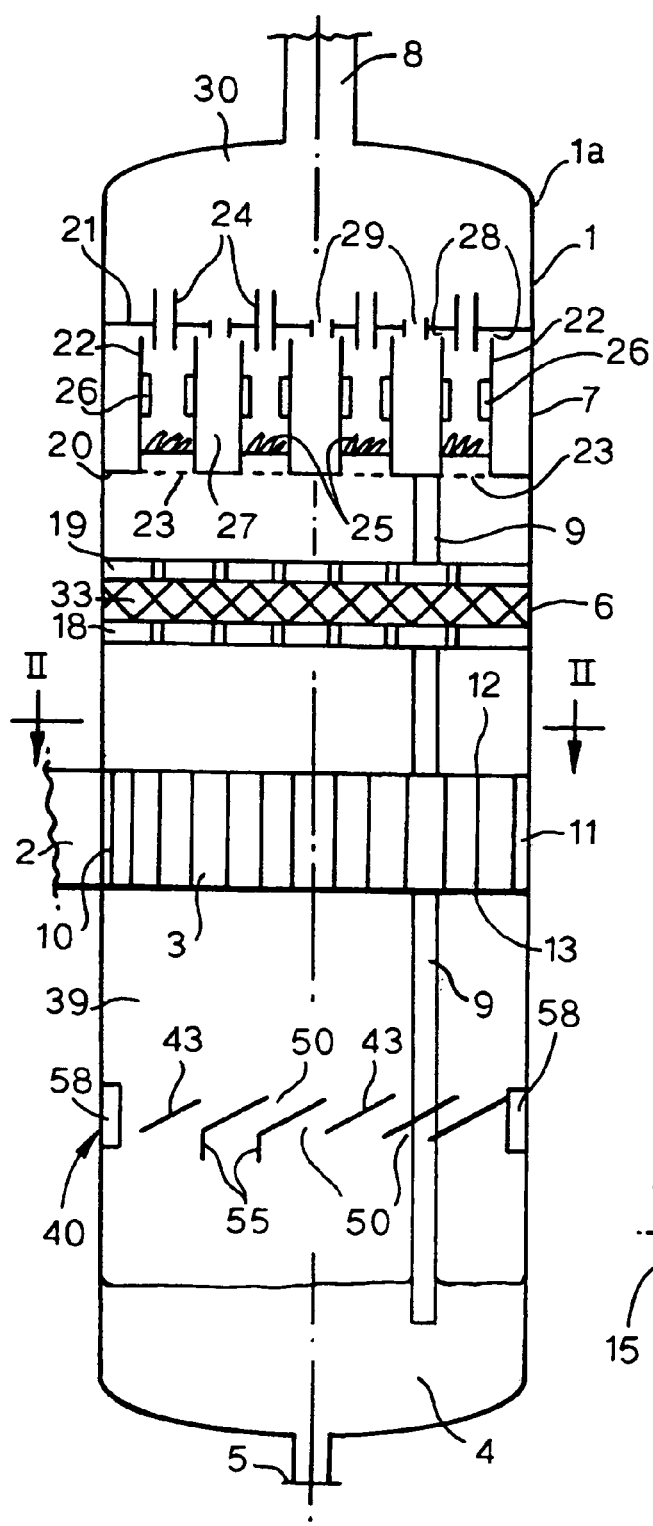
FIG. 1 shows schematically an embodiment of a separator vessel with a liquid collection promoter tray according to the present invention.
Figure 2:
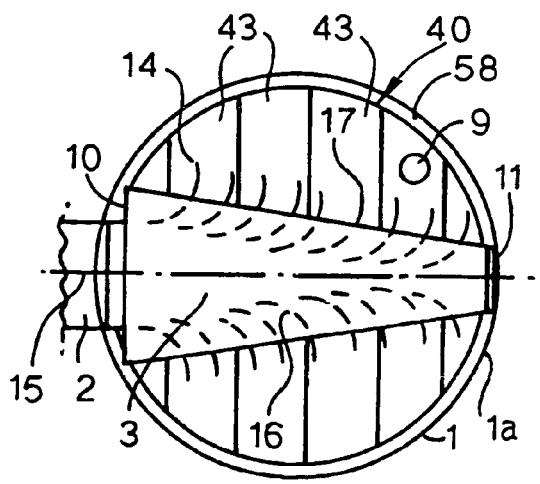
FIG. 2 shows schematically a cross-sectional view along a line II-II in FIG. 1.

Reference is made to FIGS. 1 and 2, showing a gas/liquid separator 1a for separating a fluid comprising gas and liquid into a gas-rich stream and a liquid-rich stream. The separator 1a comprises a vertical cylindrical vessel 1 having an inlet nozzle 2 in the sidewall of the vessel 1.

The vessel 1 of the depicted embodiment of the invention comprises a gas/liquid separation device 3 having an inlet connected to the fluid inlet nozzle 2 and arranged at some distance above the lower part 4 of the vessel which functions as a liquid collecting space. The lower part 4 is provided with a liquid outlet 5.

At some distance above the primary gas/liquid separation device 3, a coalescer 6 is arranged. The coalescer 6 extends horizontally over the entire cross section of the vessel. At some distance above the coalescer is a further (secondary) gas/liquid separation device 7 arranged, which also extends over the whole cross section of the vessel. The secondary separator 7 is situated at some distance below a gas outlet 8 of the vessel 1. A liquid discharge pipe 9 runs down from the secondary separator, through the coalescer, along the separation device 3 (see FIG. 2) and then into the liquid collecting space 4.

The gas/liquid separation device 3 of this embodiment is a vane-type inlet device (Schoepentoeter inlet device), which serves as a primary gas/liquid separation device. The vane-type inlet device generally horizontally extends in the vessel from the inlet nozzle 2. It has the form of a longitudinal chamber enclosed by a vertical front wall 10, a vertical rear wall 11, an upper wall 12 and a lower wall 13. The front wall 10 is provided with an opening to which the inlet 2 is connected. The walls 12 and 13 extend horizontally over practically the entire diameter of the vessel 1 and have a trapezoidal shape with the shorter side at the rear wall 11. The two vertical sides of the chamber between the walls 10 and 11 are open with horizontally outwardly curved vertical guide vanes 14, arranged between the upper and lower walls 12, 13, which vanes project through the open sides out of the chamber. The vanes 14 are grouped on either open side, one behind the other. Each vane 14 comprises a leading edge part 16 extending generally towards the inlet 2 and forming a small angle with the main direction of flow (arrow 15) in the longitudinal chamber, and an outlet part 17 extending substantially perpendicular to the leading edge part 16.

The outlet parts 17 jointly form the outlet means of the gas/liquid separation device 3.

The coalescer 6 comprises two horizontal supporting means 18 and 19 which are arranged in the vessel at some distance from each other, and between them a coalescer bed 33 consisting of a mesh pad, which is also sometimes referred to as wiremesh or mist mat. Alternative embodiments of a coalescer can for example be a layer of vanes or a layer of structured packing.

The centrifugal separator tray 7 is formed between upper and lower tray plates 20 and 21 defining a separation space between them. In the separation space, a plurality of swirl tubes 22 are arranged. Four swirl tubes 22 are shown in the drawing, but it will be understood that as little as one or as much as several hundred swirl tubes can be arranged. The lower tray plate 20 is provided with one or more inlets 23 which are in fluid communication with a fluid inlet of each swirl tube 22.

The swirl tubes generally have cylindrical shape. At the upper (downstream) end of each swirl tube a co-axial outlet pipe 24 for gas (primary gas) is arranged, one end of which extends into the swirl tube and the other end extends through the upper tray plate 21. In the lower part of each swirl tube a swirl imparting means 25 such as an arrangement of tilted vanes is arranged, to impart rotation to fluid flowing along the swirl tube. Downstream of the swirl imparting means, slits 26 are arranged in the wall of the swirl tube, through which slits liquid can pass into the free inner space 27 between the upper and lower plates 20,21. There is also fluid communication with the free inner space 27 via the annular openings 28 formed between the upper end of the swirl tubes 22 and the upper tray plate 21. Optionally the swirl tubes can be arranged or grouped in separate boxes, or can be provided with return skirts (not shown) forcing the liquid and secondary gas to enter the free inner space in downward direction.

Further outlet openings 29 for gas from the free inner space (secondary gas) are arranged in the upper tray plate 21. Outlets 24 and 29 are in fluid communication with the outlet for gas 8 of the separation vessel 1.

The liquid discharge pipe 9 extends from an inlet in the lower part of the free inner space to an outlet in the liquid collection space 4.

It will be understood that other embodiments of a centrifugal separator tray can also be used in a separation vessel of the present invention.

In accordance with the invention, a liquid collection promoter tray 40 is arranged between the vane-type inlet device 3 and the liquid collection space 4.

Preferably the vertical spacing between the lower end of the vane-type inlet device 3 and the upper end of the liquid collection promoter tray 40 is equal or larger than one diameter of the inlet nozzle 2, otherwise too large fluid velocities would result in the intermediate space 39 during operation. 200 mm, and more preferably 250 mm is considered as a minimum spacing.

Assume the vessel 1 has a diameter of 2 m and the inlet nozzle diameter is 250 mm. A suitable liquid collection promoter tray 40 can for example be formed by an arrangement of 6 parallel plates 43, each plate being 400 mm wide and conforming to the vessel wall at those sides that approach the vessel wall. The plates are tilted out of the horizontal plane, with their tilting angle in the paper plane of FIG. 1, and have their longitudinal direction perpendicular to the paper plane of FIG. 1, so that each longitudinal side of the plates runs substantially horizontal in the vessel.

A small tilting angle is sufficient to allow liquid to flow downwards on the plates, and the shielding against gas flowing vertically downwards in the column is best at small angles. Suitably, the tilting angle with the horizontal plane is less than 30 degrees, preferably 5-20 degrees, most preferably 10 degrees. The plates overlap in a shingle-like manner as shown, so that the tray 40 is optically closed when being looked at from above, like in FIG. 2. It will be understood that the number and tilting angle of the plates can be varied and optimized. Tilting angle and number of plates determine the lower limit of the height of tray 40. For 400 mm wide plates 43 at 10 degrees tilting angle the height required is only ca 70 mm. The parallel arrangement of plates forms louver-like passages 50 through which liquid can flow from the top surface of the plates to the liquid collecting space 4 below the liquid collection promoter tray 40.

The plates as shown in this embodiment extend perpendicular to the main flow direction 15 within the vane-type inlet device 3. Preseparated gas and liquid exits the vane-type inlet device in generally transversal direction. It is believed that the shown orientation of plates 43 minimizes the possibility for fluid from the outlet of the inlet device 3 to pass directly through the passages 50. It will be understood, however, that other arrangements of the plates are also possible.

The arrangement of plates can be mechanically supported by any means known in the art, e.g. by a support ring 58, which is attached to inner surface of the wall of the vessel.

It can be desirable to arrange downwardly extending baffles at the lower longitudinal sides of the plates 43, as shown for two of the plates 43 at reference numerals 55. The baffles 55 impose a larger resistance to gas flowing through the passages 50, which can be desirable in particular at larger tilting angles. The baffles 55 can, for the dimensions of the vessel 1 and plates 43 discussed above for the present embodiment, for example be up to 200 mm long, and preferably between 50 and 100 mm which limits the total height of the liquid collection promoter tray 40 to less than 200 mm.

During normal operation of the vessel 1, a gas/liquid mixture of typically 0.5-5 vol % liquid of the total mixture, in particular 0.5-3 vol %, or 3-5 vol %, is fed through the inlet nozzle 2 into the inlet device 3. The curved vanes 14 intercept the feed mixture, and gas and liquid are preseparated due to the centrifugal force exerted by the curved vanes. Liquid is accumulated on the vanes and exits from the vane tips in lateral direction, and subsequently sinks due to gravity generally downward. Gas also exits in lateral direction, and ultimately upwards, but after impinging on the vessel wall some gas initially is deflected downwardly and flows downwards together with the liquid.

The fluid above the vane-type inlet device 3 consists mainly of gas with typically 0-2 vol % non-separated or re-entrained liquid, in particular 0-1 vol % or 1-2 vol %. Gas flowing upwards in the vessel, from the inlet device 3, is redistributed over the vessel cross section under the influence of the pressure drop across the coalescer 6 at location 6 and then passes the coalescer.

If a mesh pad is used for the coalescer 6 as shown in FIG. 1, the mesh pad increases the droplet size of liquid during normal operation, i.e. when operated in the high gas load regime of gas loads above ca. 0.15 m/s. At lower gas loads such as during turn down of the operation or at temporarily lower feed rate to the vessel, such as at $\lambda \leq 0.1$ m/s, the mesh pad functions in fact not as a coalescer but as a fairly efficient separator itself, and the separated liquid showers down in the vessel from the mesh pad.

In the high gas load regime the mesh pad enhances the efficiency of further separation in the secondary gas/liquid separation device 7. In the swirl tubes 22 a rotary movement is imparted to this gas by the swirl imparting means 25, whereby the liquid is flung outwardly against the inner wall of the swirl tubes 22 due to centrifugal forces. The gas preferentially flows upwards in the axial part of the swirl tubes 22 and leaves the swirl tubes 22 via the primary gas outlets 24. The liquid is driven up in the form of a film along the tube wall 22 and is allowed to flow through openings/slits 26 in the swirl tube wall and/or openings 28 at the upper end of the swirl tubes to flow into the free inner space 27 between plates 20 and 21, outside the swirl tubes 22. A certain amount of "secondary" gas is also carried along with the liquid into this free inner space 27. The liquid is collected in the lower part of the free inner space and flows via the liquid discharge pipe 9 to the liquid collection space 4, without again coming into contact with the gas flowing through the vessel. The secondary gas flows via the secondary gas outlets 29 to the space 30 above the centrifugal separator 7, where it is added to the primary gas from the primary gas outlets 28. The gas is removed from the vessel via the gas outlet 8.

Above the secondary gas/liquid separator a further mesh pad can be arranged (not shown), which can serve to further remove liquid that has been re-entrained with secondary gas.

The preseparated liquid transversally exiting from the vane-type inlet device and some of the preseparated gas will flow downwardly. The liquid impinges on the upper surface of the liquid collection promoter tray, and a film of liquid is formed, which flows through the passages 50 downwards into the liquid collection space.

The liquid is withdrawn from the liquid collection space 4 via the liquid outlet 5.

It will be understood that the liquid collection promoter tray can also be formed by a higher or lower number of tilted plates. A practical limitation for plate width can be the size of a manhole in the vessel, often 500-600 mm. Suitably, the plates are 200-500 mm wide. A tray with wider plates is easier to manufacture and provides better shielding of the space below, but requires more height in the column.

It shall be clear that instead of a Schoepentoeter inlet device 3 as shown in FIG. 1 also a circumferential vane inlet device as disclosed in WO 03/070348 can be used. In this case, like in the embodiment of FIG. 1, the mixture entering the vessel is pre-separated in the inlet device, and pre-separated gas and liquid streams are admitted into the vessel transversely (radially) or with at least a transverse (radial) velocity component, so that gas and liquid streams are directed towards the vessel wall and not to the liquid collection space. Liquid will subsequently generally sink to the bottom, and some of the gas will also be deflected downwardly by the vessel wall. The liquid is received and guided to the liquid collection space in the same way by the liquid collection promoter tray, and the collected liquid is shielded from high gas velocities.

The separation efficiency of separation vessels for natural gas treatment can be considerably increased by installation of a liquid collection promoter tray. Where maximum efficiency is not required, the invention allows to increase the separation capacity of a vessel (throughput).

I claim:

1. A gas/liquid separator comprising:
    a vertical vessel having an inlet for a gas/liquid mixture;
    a gas/liquid separation device arranged within the vessel, which separation device has an inlet in fluid communication with the inlet of the vessel, and an outlet means for at least partially separated gas and liquid;
    an outlet for gas from the vessel, above and in fluid communication with the outlet means of the separation device;
    a liquid collection space in the vessel, below and in fluid communication with the outlet means of the separation device; and
    an outlet for liquid from the vessel, having a receiving end in the liquid collection space,
    wherein the separation device is a vane inlet device, and
    wherein between the separation device and the liquid collection space a liquid collection promoter tray is arranged, forming a receiving area for liquid impinging on the tray from above and having a passage for liquid received on the receiving area to flow to the liquid collection space;
    wherein the liquid collection promoter tray is optically closed when being looked at from above; and
    wherein the liquid collection promoter tray comprises an arrangement of plates that are tilted out of the horizontal plane.

2. The gas/liquid separator according to claim 1, wherein the plates have longitudinal sides horizontally extending in the vessel, and wherein the plates are arranged with their longitudinal sides parallel to each other.

3. The gas/liquid separator according to claim 2, wherein the plates overlap in horizontal direction.

4. The gas/liquid separator according to claim 3, wherein the liquid collection promoter tray conforms to the circumference of the vessel.

5. The gas/liquid separator according to claim 4, wherein the outlet means of the gas/liquid separation device is arranged to admit pre-separated gas and liquid transversally or with a transversal velocity component into the vessel.

6. The gas/liquid separator according to claim 5, wherein the gas/liquid separation device is a primary separation device, and wherein a secondary gas/liquid separation device is arranged above the primary separation device.

7. The gas/liquid separator according to claim 6, further comprising a coalescing device, for example a mesh pad, between the primary and secondary separation devices.

8. The gas/liquid separator according to claim 7, further comprising a coalescing device, for example a mesh pad, above the secondary separation device.

* * * * *